United States Patent [19]

Barsellotti

[11] 4,101,740
[45] Jul. 18, 1978

[54] LINE CIRCUIT FOR KEY TELEPHONE SYSTEMS

[75] Inventor: John Anthony Barsellotti, Guelph, Canada

[73] Assignee: International Standard Electric Corporation, New York, N.Y.

[21] Appl. No.: 777,178

[22] Filed: Mar. 14, 1977

[51] Int. Cl.² .............................................. H04M 1/00
[52] U.S. Cl. ..................................................... 179/99
[58] Field of Search .................. 179/99, 18 F, 18 FA, 179/81 R, 84 R

[56] References Cited

U.S. PATENT DOCUMENTS

| | | | |
|---|---|---|---|
| 3,764,752 | 10/1973 | Yachabach | 179/99 |
| 3,766,325 | 10/1973 | Hatfield et al. | 179/99 |
| 3,856,994 | 12/1974 | Ozechoski | 179/99 |
| 3,914,556 | 10/1975 | Frazee | 179/18 F |
| 4,004,106 | 1/1977 | Yachabach | 179/99 |
| 4,039,763 | 8/1977 | Angner | 179/99 |
| 4,064,373 | 12/1977 | Pinede et al. | 179/99 |

*Primary Examiner*—William C. Cooper
*Assistant Examiner*—G. F. Brigance
*Attorney, Agent, or Firm*—James B. Raden; Marvin M. Chaban

[57] ABSTRACT

A line circuit for a key telephone system using as the main operative components, two relays i.e. a ring relay and a combined off-hook and hold relay and an optical coupler and rectifier bridge combination. On a ring signal from the exchange, the optical coupler is activated to cause the energization of the ring relay. On a station of the line going off-hook, the conventional A lead ground operates the off-hook relay and causes de-energization of the ring relay. When a station of the line goes into hold, the circuit must differentiate this condition from a hang-up condition. This differentiation is performed by the coupler sensing the line voltage as low or high. The line voltage is high if the line loop is open indicating a hang-up condition. The line voltage is low if the line loop is still closed during the sensing period as a preliminary to the hold condition. The off-hook relay is held during this sensing operation so that the circuit may enter the hold condition when indicated.

7 Claims, 1 Drawing Figure

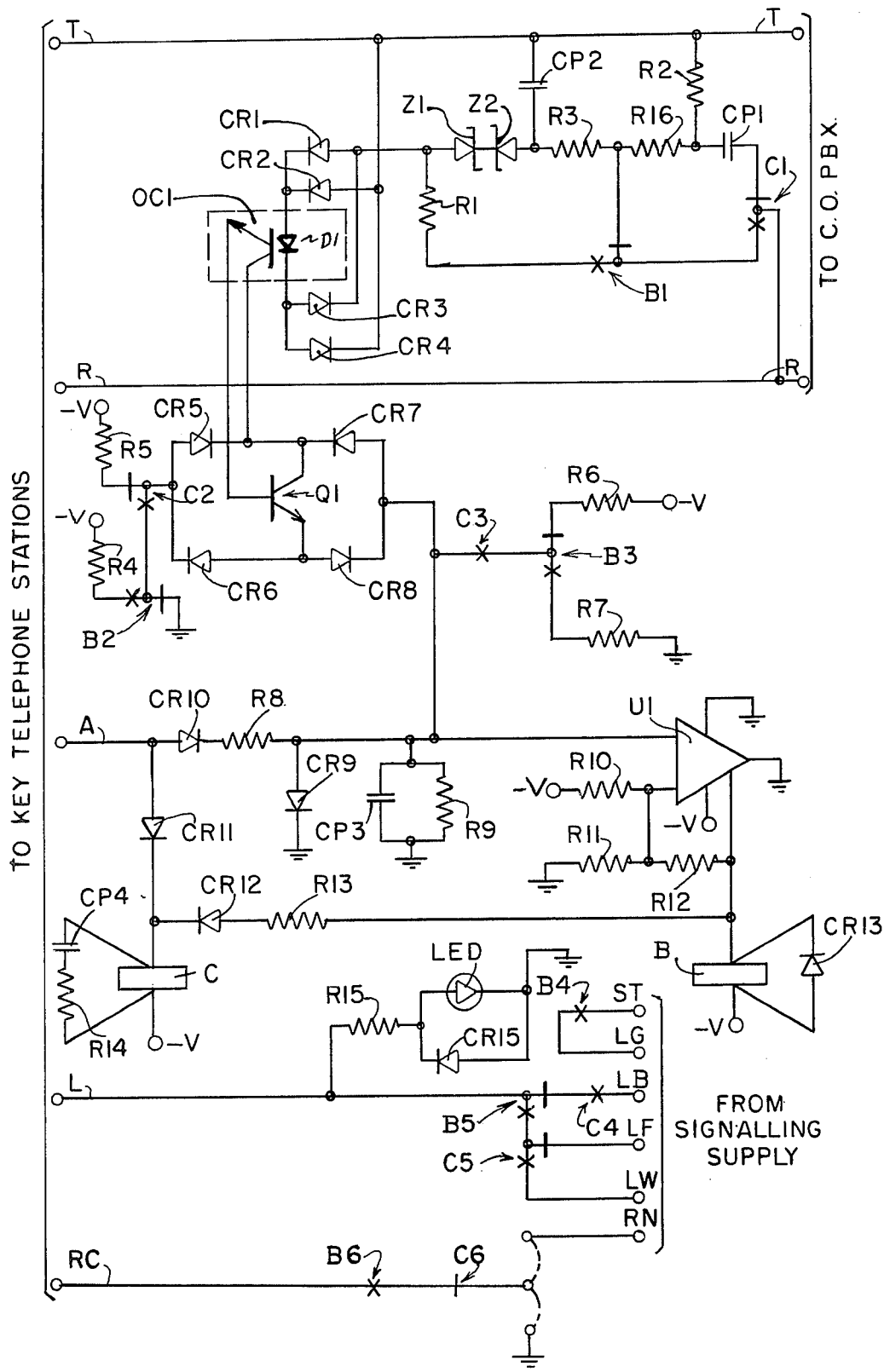

LINE CIRCUIT FOR KEY TELEPHONE SYSTEMS

BACKGROUND OF THE INVENTION

Line circuits for key telephone systems are well-known based on the Bell System 400B line card (U.S. Pat. No. 3,239,610 issued Mar. 8, 1966 to Morse et al.) and the 400D card (U.S. Pat. No. 3,436,488 issued Apr. 1, 1969 to Barbato et al.).

Later reference patents such as U.S. Pat. No. 3,647,983 issued Mar. 7, 1972 to Fitzsimons et al. and U.S. Pat. No. 3,715,516 issued Feb. 6, 1973 to Ebrahimi show variations using three relays to produce the same results as the cited Barbato patent, using the same input conditions and producing the same outputs.

Many subsequent patents have issued for key system line circuit patents, the circuits being essentially plug compatible with those noted, thus all the circuits receive and respond to the same input conditions to produce the same output conditions.

Of these, the more recent employ solid state devices to a larger degree with emphasis on one or more optical isolators or optical couplers performing the function of the line relay. Some of these patents include: U.S. Pat. Nos. 3,766,325 issued Oct. 16, 1973 to Hatfield and 3,764,752 issued Oct. 9, 1973 to Yachabach.

SUMMARY OF THE INVENTION

The present invention discloses a two relay line circuit for a key telephone system using a ring control relay (B relay) and combined off-hook and hold control relay (C relay). These relays combine to produce the output conditions, there being four such conditions: (1) Idle with both relays unoperated; (2) Ring causing the B relay to operate; (3) Off-hook or Busy causing the C relay to operate; and (4) Hold causing both the B and C relays to operate.

Three operating conditions must be responded to -- Ring, Busy and Hold. For Ring, the optical coupler is switched on to drive an operational amplifier beyond its threshold to operate the ring relay. The ring relay in a conventional manner controls the lamp flash and local ring or buzzer supply to stations of the called line being rung. When a station of the line goes off-hook to enter the busy or seize condition, the conventional ground on the A lead is fed directly to the C relay (sometimes called the A relay) to cause the C relay to be energized. The A lead ground also switches the amplifier off and shuts off the B relay. The C relay on energization switches the visual signals to a steady on and opens the audible signaling circuits further.

On a hold signal from the off-hook station, the A lead ground is open-circuited in the conventional sequencing before the line loop opens. The C relay remains operated for a timed period sufficiently long to sense whether the condition is a hold or hang up. The optical coupler performs this function by sensing the line voltage. When the line voltage is low, indicating that the line loop is still closed, the coupler is not turned on. A capacitor charges to operate the inverter amplifier and the B relay. When the B relay operates, before the C relay has been released, a hold path for the C relay is closed. A resistance bridge is closed across the line conductors, the subscriber lamps are pulsed at a wink rate with audible signaling remaining inactive due to operation of the C relay. The circuit has now responded to the hold condition, the B and C relays being operated.

When the line loop is open, indicating the station has hung up, the line voltage is high, the coupler responds by turning on. With the coupler now on the B relay is prevented from being energized. Thus, in the circuit as shown, an optical coupler responds to ringing signals and to a hold condition by sensing the level of the line voltage.

It is therefore an object of the invention to provide an improved line circuit for key systems.

It is a further object of the invention to provide a line circuit for key systems which uses an inverting operational amplifier and optical coupler to provide the relay operating logic in the circuit.

It is still a further object of the invention to provide a line circuit for key systems in which the relay operating logic normally tries to drive the circuit to a hold condition on release of the A lead ground, the hold being overidden by the operation of the optical coupler at that time.

BRIEF DESCRIPTION OF THE DRAWING

The single drawing shows a schematic circuit drawing of my invention.

DETAILED DESCRIPTION OF THE DRAWING

For the circuit shown, the subscribers station equipment is similar to that shown in the cited Barbato patent and includes a line key with three hookswitch contacts and hold key contacts. As the operation of these contacts is conventional as shown by many key system line circuit patents, the operation of these contacts will only be described where necessary to complete the explanation.

In the drawing, I show my line circuit with the conventional tip and ring conductors extending from terminals at a C.O. or PBX on one end and terminals to key telephone at the other end. Across the line is a full wave bridge rectifier RB1 and across its diagonal terminals, diode D1 for optical coupler OC. In series with this path is a pair of Zener Diodes Z1 and Z2, resistors R3 and R16, capacitor CP 1, closed contacts C1 and the ring lead.

The D.C. logic circuitry is electrically isolated from the line sensing circuit, the logic including the two relays B and C, each with one terminal of its single winding connected to negative battery which may be the conventional −24 volts and the other terminal of the respective windings are connected to operating terminals, the B relay terminal being connected to an output of an operational amplifier U1 and the C relay terminal being connected to the conventional A lead ground terminal through a diode CR 11.

In the idle condition, relays B and C are unoperated. The optical coupler OC 1 is inactive since the flow of D.C. current from the line is blocked by open contacts C1 and capacitor CP 1. Capacitor CP 3 is discharged maintaining the output of amplifier U1 negative. Capacitor CP 2 provides imunity from 60 HZ induced from adjacent power lines.

Amplifier U1 is a conventional amplifier such as the LM 311 voltage comparator sold by National Semiconductor. The application of the amplifier has the normal amplifier output lead grounded, with the load (B relay) inverted. The amplifier inverts the output to the lead when the positive input is more positive than the negative input. The biasing of the negative input uses resistors R10, R11 and R12 for setting the operating threshold of the amplifier with resistor R12 also providing the hysteresis setting.

When ringing signals are received from the CO/PBX on the line conductor R, a path may be traced for these AC signals through closed contacts C1, capacitor CP 1, resistors R16 and R3, zener diodes Z2 and Z1 (16 volt breakdown diodes), rectifier bridge CR 1 – CR 4 to the T lead. Coupler OC 1 has its input diode D1 across the diagonal to sense the bridge output, and responds to the rectified A.C. input to turn on transistor Q1. With Q1 on, the main timing capacitor CP 3 charges over a path from negative voltage through resistor R5, contacts C2 and the rectifier bridge CR 5 – CR 8. The capacitor charge prevents response to spurious noise signals in the known manner.

When the charge on capacitor CP 3 reaches the operating threshold of amplifier U1, U1 switches and drives its output positive to complete an obvious operating path to relay B. Relay B operates and switches its contacts B1 – B6. Contacts B4 close to complete a start path to the interrupter, and contacts B5 and B6 switch to provide visual and audible signaling in a conventional manner. Remaining B relay contacts switch but have no effect at this time.

If the ringing or calling party hangs up, the input of ringing signals stops. With relay C unoperated, no A.C. signals are passed to OC 1 and the coupler shuts off. With coupler OC 1 off, transistor Q1 shuts off and capacitor CP 3 discharges to cause comparator U1 to restore after a timed period.

In the normal circumstances, with ring continuing the called party will respond by going off-hook. As is known, operation of the hook switch in going off-hook places ground on the A lead. The ground on the A lead causes relay C to operate over the obvious path. This ground on the A lead causes the capacitor CP 3 to discharge over the A lead through resistor R8 and diode CR 10. The discharge of the capacitor CP 3 lowers the voltage at the positive input of amplifier U1, and causes the comparator U1 to shut off and de-energize relay B.

Relay C operates and closes its six contact sets. Of these, contacts C4 connect the lamp lead L to lead LB to provide steady lamp operation. Contacts C1 switch to prepare the voltage level sensing function of coupler OC 1. A path may be traced from line conductor R at the CO/PBX side of the card, the path being through closed contacts of set C1 and B1 resistor R3 to diodes Z2 and Z1. Since the closed loop voltage across line conductors T and R is low, the break down voltage of zener diodes Z1 and Z2 is not reached and coupler OC remains off.

Contacts C2 switch to change the charge-discharge path to capacitor CP 3 via Q1 in preparation for timing possible hold conditions, contacts C3 close another charge/discharge path for capacitor CP 3 through contacts C3 and B3 (presently released) to negative battery. The ground on the A lead overrides the negative voltage through contacts C3 and B3 and the closure of contacts C3 has no effect at this time. A clear metallic path is provided between the line conductors on the CO/PBX side and the station side without any impedance elements in the line loop.

From the answer condition, a station may enter the hold condition or may release and hang up. The hold condition will be described first. As is conventional, the first response to depression of the hold button is removal of ground from the A lead. The operating path to the C relay is opened, however the C relay remains operated for a timed period determined by the R-C time constant of resistor R14 and capacitor CP 4.

With the C relay held operated, an enabling path to coupler OC 1 is maintained through contacts C1. When the line loop exhibits a low D.C. voltage indicative of a continued closed circuit at the station loop, the path through Zener diodes Z1 and Z2 will not break down, coupler OC 1 will not turn up. The natural tendency of the line circuit once the A lead ground has been removed is to move toward the hold condition under the effect of the negative voltage from closed contacts C3. This negative voltage charges capacitor CP 3 above the operating threshold of comparator U1. Comparator U1 switches and energizes the B relay. With relay B operated, a hold path for the C relay is maintained through the B relay operate path at the comparator U1.

Relays B and C are both operated to start the signaling supply to provide the lamp wink signal to the stations of the held line. With both the B and C relays operated, contacts B1 and C1 are closed, the hold resistor R1 is bridged across the line conductors through the bridge rectifier. This resistance holds the line from release at the C.O. end.

With a line being held, two possibliities exist, one — that the line be returned to the answer condition by depression of the line key once again off-hook, or two — that the line is released by a signal from the C.O. (removal of line voltage for a period of more than 100 m.s.).

Depression of the line key once again closes ground on the A lead to maintain the C relay operated. The A lead ground is fed to the positive terminal to the comparator U1 and shuts the comparator off, deenergizing the B relay. The line is then in the busy or answer condition with the C relay operated to provide steady lamp signals to the line.

When a busy line hangs up (goes on-hook) the ground is removed from the A lead and the circuit attempts to enter the hold condition. The C relay holds temporarily. The line voltage increases to cause the zener diodes to break down and conduct. Coupler OC 1 is turned on to turn Q1 on. Capacitor CP 3 discharges to ground at closed contacts, B2 keeping the comparator U1 off and relay B unoperated. After a time, relay C releases and returns the circuit to idle. The coupler shuts off when contact C1 switches.

When a hold release signal is received from the C.O., voltage is temporarily removed from the line conductors. Coupler OC 1 turns off thereby shutting down transistor Q1. Capacitor CP 3 discharges over the path through contacts C3 and B3 and lowers the voltage at the input to capacitor U1. Comparator U1 shuts off and causes relay B to restore. With relay B restored and no A lead ground, the C relay will restore after its timed release cycle. The circuit is thereby returned to its idle condition.

From the foregoing, it can be seen that with the line circuit in the answer condition with the C relay operated, the B relay must operate after the A lead ground is removed and before the optical coupler is turned on to initiate a hold condition.

With the line circuit in the answer condition, the station goes on-hook, the coupler turns on before the B relay is operated to discharge the main capacitor (CP 3) and keep the B relay from being energized. The coupler senses line voltage to operate responsive to an open loop as long as the C relay remains operated. When the C relay restores its contacts C1, the D.C. path to the coupler is opened and it restores returning the circuit to the idle condition.

On a low voltage condition resulting from the loop remaining closed for a timed period after the A lead ground has been removed, the line circuit enters the hold condition by operating the comparator (as described previously) to operate the B relay and hold the C relay.

Thus, there is shown a line circuit for key telephone systems using one optical coupler and two relays to provide its response to input conditions. The coupler is turned on by an AC ring condition, or in response to an open loop condition of the line. The open loop sensing function is only enabled for a transition from the off-hook condition or from the hold condition.

When the circuit is in the off-hook or line busy condition, it is biased to enter hold except when prevented by the turning on of the optical coupler.

I claim:

1. A line circuit for a line of a key telephone system including means for sensing ringing current, means responsive to the sensing of the ringing current for operating a control member to cause operation of a first relay, said first relay on operation controlling signaling to stations of the line, a second relay responsive to a seize ground signal from one station of said line indicative of an off-hook condition of said one station to operate and signal the stations of said line accordingly, means for maintaining said second relay operated for a timed period after removal of said seize ground signal, said ring sensing means operative to sense the level of line voltage across the conductors of said line during said timed period of operation of said second relay, said ring sensing means operative when said line voltage exceeds a predetermined voltage indicative of release of the off-hook condition at said one station for causing restoration of said second relay.

2. A line circuit as claimed in claim 1, in which said control member comprises a voltage comparator connected in open collector configuration to produce a first relay operating output to said first relay on the sensing of ringing current by said ring sensing means.

3. A line circuit as claimed in claim 1, wherein said ring sensing means biases said control member toward producing a first relay operating output with said second relay operated, said ring sensing means overcoming the bias of said biasing means when the line voltage exceeds said predetermined voltage indicating release of said line at a station of said line.

4. A line circuit as claimed in claim 3, in which said ringing current sensing means comprises an optical isolator with a first bridge rectifier across its input circuit, and a second bridge rectifier across its output circuit.

5. A line circuit for a key telephone system including a sensing circuit including an optical coupler coupled to the line conductors to receive rectified ringing current from the line, the output circuit of said coupler coupled to charge a main timing capacitor, a comparator circuit for comparing the charge on said capacitor against a standard for turning on said comparator when the charge on said capacitor exceeds the threshold of said comparator to operate a ring control relay, said capacitor connected to discharge on occurence of ground on the seize control lead to lower the voltage on said comparator below said threshold to shut off said comparator and restore said ring control relay, a seize control relay responsive to ground on said seize control relay to operate, said optical coupler connected across the line conductors to monitor line voltage, said coupler non-conductive with a line loop closed across said line conductors to allow said capacitor to charge and raise the voltage directed to said comparator above its threshold when said seize control ground is removed, said optical coupler conductive when said line loop is opened to discharge said capacitor and release said ring control relay.

6. A line circuit as claimed in claim 5, in which said sensing circuit includes voltage regulating means and a bridge rectifier in the input path to said optical coupler.

7. A line circuit as claimed in claim 6, in which said seize control relay includes a path for discharging said timing capacitor and another path for charging said capacitor.

* * * * *